United States Patent
Jeng

(10) Patent No.: US 8,846,150 B2
(45) Date of Patent: Sep. 30, 2014

(54) BUILDING MATERIAL HAVING A FLUOROCARBON BASED CAPSTOCK LAYER AND PROCESS OF MANUFACTURING SAME WITH LESS DIMENSIONAL DISTORTION

(75) Inventor: Jong P. Jeng, Maple Glen, PA (US)

(73) Assignee: Certainteed Corporation, Valley Forge, PA (US)

(*) Notice: Subject to any disclaimer, the term of this patent is extended or adjusted under 35 U.S.C. 154(b) by 0 days.

(21) Appl. No.: 12/875,477

(22) Filed: Sep. 3, 2010

(65) Prior Publication Data

US 2010/0330272 A1 Dec. 30, 2010

Related U.S. Application Data

(62) Division of application No. 11/247,620, filed on Oct. 11, 2005, now abandoned.

(51) Int. Cl.
| | |
|---|---|
| *B05D 1/36* | (2006.01) |
| *E04C 3/28* | (2006.01) |
| *E06B 3/30* | (2006.01) |
| *E06B 3/22* | (2006.01) |
| *E04F 13/18* | (2006.01) |
| *E04C 3/02* | (2006.01) |
| *B41M 3/00* | (2006.01) |
| *B41M 3/06* | (2006.01) |

(52) U.S. Cl.
CPC ............ *E04C 3/28* (2013.01); *E04C 2003/023* (2013.01); *E06B 3/30* (2013.01); *B41M 3/00* (2013.01); *E06B 3/22* (2013.01); *E04F 13/185* (2013.01); *B41M 3/06* (2013.01)
USPC ............................ 427/267; 427/256; 427/280

(58) Field of Classification Search
CPC ....... E04C 3/28; E04C 2003/023; E06B 3/30; E06B 3/22; E04F 13/185; B41M 3/06; B41M 3/00
USPC .......................................... 427/256, 267, 280
See application file for complete search history.

(56) References Cited

U.S. PATENT DOCUMENTS

| | | | |
|---|---|---|---|
| 2,790,202 | A | 4/1957 | Lorenian |
| 3,704,071 | A | 11/1972 | Muller et al. |

(Continued)

FOREIGN PATENT DOCUMENTS

| | | |
|---|---|---|
| WO | WO 97/04019 | 2/1997 |
| WO | WO 98/52996 | 12/1998 |
| WO | WO 2006/036409 | 4/2006 |

OTHER PUBLICATIONS

The Engineering Toolbox, Coefficients of Linear Thermal Expansion, http://www.engineeringtoolbox.com/linear-expansion-coefficients-d_95.html.*

(Continued)

*Primary Examiner* — Michael Cleveland
*Assistant Examiner* — Xiao Zhao
(74) *Attorney, Agent, or Firm* — Alexander H. Plache; Abel Law Group, LLP

(57) ABSTRACT

The present invention provides building materials and methods for the manufacturer which includes an extrudable thermoplastic or thermosetting substrate having a fluorocarbon-based capstock layer applied to the substrate. The fluorocarbon-based capstock layer can further include one or more top coats for providing a variegated, colored or textured pattern. The capstock layer, with or without the top coats, preferably has a thickness less than 4 mil and contains a UV-resistant PVDF resin.

17 Claims, 3 Drawing Sheets

(56) References Cited

U.S. PATENT DOCUMENTS

| | | | |
|---|---|---|---|
| 3,871,629 | A | 3/1975 | Hishida |
| 3,875,088 | A | 4/1975 | Arons et al. |
| 3,983,195 | A | 9/1976 | Arons et al. |
| 4,048,101 | A | 9/1977 | Nakamachi et al. |
| 4,302,410 | A | 11/1981 | Beach |
| 4,356,216 | A | 10/1982 | Gailey et al. |
| 4,356,217 | A | 10/1982 | Wollam et al. |
| 4,411,215 | A | 10/1983 | Gailey et al. |
| 4,411,218 | A | 10/1983 | Wollam et al. |
| 4,505,569 | A | 3/1985 | Seto et al. |
| 4,528,155 | A | 7/1985 | Elder |
| 4,649,008 | A | 3/1987 | Johnstone et al. |
| 4,721,592 | A | 1/1988 | Fruehauf et al. |
| 4,810,733 | A | 3/1989 | Sakuma et al. |
| 5,053,176 | A | 10/1991 | Cameron et al. |
| 5,053,444 | A | 10/1991 | Trotoir |
| 5,126,088 | A | 6/1992 | Andres |
| 5,232,751 | A | 8/1993 | Cameron et al. |
| 5,284,693 | A | 2/1994 | Spain et al. |
| 5,387,381 | A | 2/1995 | Saloom |
| 5,804,285 | A * | 9/1998 | Kobayashi et al. ............ 428/172 |
| 5,866,054 | A | 2/1999 | Dorchester et al. |
| 5,866,639 | A | 2/1999 | Dorchester et al. |
| 5,869,176 | A | 2/1999 | Dorchester et al. |
| 5,998,006 | A | 12/1999 | Bambara et al. |
| 6,122,877 | A | 9/2000 | Hendrickson et al. |
| 6,752,941 | B2 | 6/2004 | Hills |
| 6,823,794 | B2 | 11/2004 | Bosler |
| 7,473,722 | B2 | 1/2009 | Guiselein et al. |
| 7,478,797 | B2 | 1/2009 | Laws et al. |
| 2003/0193718 | A1* | 10/2003 | Budd et al. ................... 359/536 |
| 2003/0218266 | A1 | 11/2003 | Hills |
| 2004/0009338 | A1* | 1/2004 | Jo et al. ....................... 428/297.4 |
| 2004/0142157 | A1* | 7/2004 | Melkonian ................ 428/292.1 |
| 2005/0003221 | A1 | 1/2005 | Walrath |
| 2005/0023148 | A1* | 2/2005 | Lockard et al. .............. 205/136 |
| 2005/0257473 | A1* | 11/2005 | Shaw et al. ..................... 52/480 |
| 2006/0013994 | A1* | 1/2006 | Burke et al. ................. 428/131 |
| 2006/0068131 | A1 | 3/2006 | Hanrahan |

OTHER PUBLICATIONS

"Acrylic Resin Improves PVC Substrate Appearance", ThomasNet Industrial Newsroom, Aug. 16, 2002, 1 page, www.news.thomasnet.com.

"New Solarkote® PV Acrylic Capstock Resin from Autoglas Improves Weatherability and Appearance of PVC Substrates", ThomasNet Industrial Newsroom, Aug. 7, 2002, pp. 1-4, www.news.thomasnet.com.

Capstocks, Films Vie to Protect Outdoor Protects, Modern Plastics Worldwide Copyright 2003, pp. 1-4, www.modplas.com/inc/mparticle.

Wolverine Master Craftsmen Education and Development Program, Wolverine Siding Systems, 2002, pp. 8-12, www.siding.com.

Kynar® PVDF Overview, Arkema Corp., pp. 1-5, www.products.arkemagroup.com.

"Capstock Resin Provides UV Protection for ABS Substrates", ThomasNet Industrial News Room, Oct. 14, 2002, 1 page, www.news.thomasnet.com.

"Solarkote® A Acrylic Capstock Resins Exend UV Protection for ABS Substrates", ThomasNet Industrial News Room, Oct. 14, 2002, pp. 1-4, www.news.thomasnet.com.

Pipe and Profile, International Trade Fair, British Plastics & Rubber, May 2004, pp. 14-22, www.polymer-age.co.uk.

Capstock, Vinyl by Design, Siding, Glossary, 2005, pp. 1-2, www.vinylbydesign.com.

Solarkote, Acrylic Capstock for Vinyl Fencing, Atoglas, Atofina Chemicals, 2003, 5 pages.

Frequently Asked Questions, PPG Industries, Inc., Industrial Coatings, 1996-2001, pp. 1-3, www.ppg.com/car.

Coating Materials and Specifications List, Orion Industries Ltd., 2005, 2 pages, www.orioncoat.com/services/list.html.

Powder Coating Forum, PF Online, 2005, 2 pages, www.pfonline.com/dp/forums/forum.

Teflon Coating Application, ICS Technologies, 1997-2001, pp. 1-3, www.icstechnologies.com.

"Should We Phase Out PVC?", Feature—Environmental Building News, Jan./Feb. 1994, pp. 1-21, www.buildinggreen.com/features.

"The 120 Best Matching Products in Building Supplies/Millwork/Moulding", PriceComparison.com, 2004, pp. 1-7, http://64.233.167.104/search?q=cache:bKO551DVZPEJ:forsoftwares.com/search.php%3F.

Notice of Allowance dated Feb. 4, 2004 in U.S. Appl. No. 10/389,400.

Office Action dated Mar. 17, 2008 in U.S. Appl. No. 10/872,690.

Notice of Allowance dated Aug. 12, 2008 in U.S. Appl. No. 10/872,690.

Office Action dated Apr. 29, 2008 in U.S. Appl. No. 11/247,620.
Office Action dated Aug. 5, 2008 in U.S. Appl. No.11/247,620.
Office Action dated Jan. 22, 2009 in U.S. Appl. No. 11/247,620.
Office Action dated Aug. 20, 2009 in U.S. Appl. No. 11/247,620.
Office Action dated Feb. 5, 2010 in U.S. Appl. No. 11/247,620.
Office Action dated May 5, 2010 in U.S. Appl. No. 11/247,620.
Office Action dated Aug. 5, 2010 in U.S. Appl. No. 11/247,620.

* cited by examiner

BUILDING MATERIAL HAVING A FLUOROCARBON BASED CAPSTOCK LAYER AND PROCESS OF MANUFACTURING SAME WITH LESS DIMENSIONAL DISTORTION

CROSS REFERENCE TO RELATED APPLICATIONS

The present application is a division of U.S. patent application Ser. No. 11/247,620, filed Oct. 11, 2005, now abandoned, which is related to U.S. Ser. No. 10/389,400 filed Mar. 14, 2003, now U.S. Pat. No. 6,752,941, both of which are hereby incorporated by reference in their entireties.

FIELD OF THE INVENTION

The present invention relates to building materials having a capstock which may contain durable imagery to simulate actual surface textures, colors and appearances, and more particularly, siding, decking, window and fencing components having a wood grain.

BACKGROUND OF THE INVENTION

Vinyl siding was introduced in the early 1960's, but did not gain much attention until the 1970's. During the 1980's and 1990's, its use increased dramatically. Siding is the second largest market for polyvinyl chloride ("PVC") resin, after pipe manufacturing, with approximately one billion pounds of resin used for this purpose in 1992. Vinyl siding is manufactured by a co-extrusion process in which two layers of PVC are generated in a continuous manner. The top layer called a capstock layer, comprises about one-quarter to one-third of the siding thickness and includes about 10% titanium dioxide, which is an opaque filler that provides some measure of UV protection for the lower layer, typically called the substrate. The substrate typically includes about 15% calcium carbonate, which balances the weight of the titanium dioxide to keep both extrusion streams equally fluid during manufacturing. A small quantity of a stabilizer such as tin mercaptan or butadiene is added as a stabilizer to chemically tie up any hydrochloric acid that is released into the PVC material as the siding ages. Lubricants may also be added to aid in the extrusion manufacturing process.

Vinyl siding is often considered a cheap substitute for wood, and is favored in some markets because of its lower maintenance requirement, it generally doesn't need to be painted or stained like real wood. Nevertheless, due to sun exposure, vinyl siding colors can dull and the surface of siding can become chalky.

Accordingly, artisans have continued to develop improved resin formulations for capstock layers to minimize the degradation of siding, decking, window, and fencing products made from PVC due to exposure of weather conditions including moisture and sunlight. For example, Solarkote® PB acrylic capstock resin from Atoglas of Philadelphia, Pa. has been commercialized as a capstock resin for imparting long lasting weatherability and enhancing the color and appearance of PVC substrates. When blended with PVC resin and co-extruded over PVC substrates as a capstock, Atoglas claims its Solarkote® PB acrylic resin upgrades PVC properties for exterior building products. The manufacturer also claims that Solarkote® PB/PVC blends impart weathering performance in medium dark colors where chalking can be an issue. Additionally, Atoglas' literature states that this coating exhibits improved color hold in whites—even at higher elevations in locations such as Arizona and Colorado. Solarkote® Acrylic capstock resin is advertised as screening out UV radiation in layers as thin as 6 mil (0.006 in). It is further suggested that this resin is suited for co-extruded applications for use in watercraft, recreational vehicles, lawn and garden products, building construction, automotive accessories, outdoor enclosures, tubs, spas and pool accessories.

Atoglas advertises that its Solarkote® capstock can be provided in a multi-layered form to often eliminate the need for painting. This three-layer co-extruded structure includes a polycarbonate, ABS, HIPS, acrylic-styrene-acrylonitrile, polycarbonate, PETG, or vinyl, plus two acrylic layers. Autoglas also advertises that by extruding the pigment in the center acrylic layer, the color effect has more depth and is better protected from scratches and weathering problems. The top layer is suggested as including a UV package that protects the pigment in the subsequent layer and the Solarkote® acrylic resins permit the designer to choose between matte, gloss and frosted effects. See trade literature articles entitled "Acrylic Resin Improves PVC Substrate Appearance" Thomas Net Industrial Newsroom Aug. 16, 2002 and "New Solarkote® PV Acrylic Capstock Resin from Autoglas Improves Weatherability and Appearance of PVC Substrates" Thomas Net Industrial Newsroom Aug. 7, 2002, (www.news.thomasnet.com) and trade literature entitled "Capstocks, Films Vie to Protect Outdoor Protects, Modern Plastics Worldwide Copyright 2003, (www.modplas.com/inc/mparticle).

In addition to color retention, manufacturers have also been focusing on producing vinyl building products with simulated wood-grain or other multi-colored appearances. Various methods of manufacturing such plastic articles have been used, but very few have succeeded in achieving a realistic wood-grain appearance in which the wood grain is strongly accented against a background layer. Typical processes involve blended colors including streaked, semi-transparent stained wood appearances often achieved through a multi-viscosity fusion process. This multi-viscosity fusion process uses multiple colorants of different viscosity, or thicknesses. Each color flows and mixes differently in the extruder. The first, usually a lighter color, melts easily and quickly and, thus, forms the background color for the siding. The second, usually a darker color, melts later in the extrusion process and streaks because it does not disperse completely. The blended effect is actually the darker color sitting on top of the lighter base color, creating a semi-transparent stained wood appearance. See, for example, U.S. Pat. No. 4,048,101 to Nakamachi, assigned to Daicel Ltd., and U.S. Pat. No. 5,387,381 to Saloom, assigned to Alcan Aluminum Corporation, and trade literature entitled Wolverine Master Craftsmen Education and Development Program© 2002 Wolverine, page 12 (www.siding.com).

Applicants have also experimented with using transparent pigment blends having different vicat softening temperatures based on poly-alpha-methylstyrene or other polymers, such as acrylic, acrylic-styrene acrylonitrile (ASA), acrylonitrile-ethylene-propylene-styrene (AES) or other transparent, opaque and/or translucent, weatherable polymers, or combinations of PVC and one or more of the above-noted polymers. See U.S. Pat. No. 6,752,941.

Through its experience in manufacturing PVC siding with ASA capstock, CertainTeed Corporation has observed that existing ASA capstock material has a fairly narrow processing window during extrusion with unfortunate consequences if the processing window is missed. If the processing temperature is too high during the manufacturing of such products, the melt viscosity of the capstock will become sticky; if the temperature is too low, the melt flow will center around the die.

There is also a noticeable difference in the coefficient of linear thermal expansion between ASA and PVC. This can lead to a difference in contraction rates during cooling between the predominantly ASA capstock and the predominantly PVC substrate, which can lead to undesirable bowing or dimensional distortion of the building material. It has also been noticed that for many variegated products using streaker pigment in acrylic based capstocks, it is inherently difficult to control the melt rheology in the ASA matrix for consistent streak wood grain patterns.

Notwithstanding the thermal contraction rate problem between ASA and PVD in siding products, others have developed techniques of providing wood grains by printing. See U.S. Pat. No. 6,823,794 to Bosler et al., and assigned to Bosler Designs, Inc. The '794 patent describes a method for printing an extruded sheet which includes the steps of extruding a sheet having an elevated temperature in the range of about 250° F. to about 450° F. and applying a heat curable ink or evaporable ink over the extruded sheet having the elevated temperature whereby the ink is cured immediately upon contact. The machinery selected by Bosler et al. can include multiple print rollers for printing in order to formulate a combination of colors. A plastisol ink which cures at a temperature of about 140° F. to about 200° F. along with evaporable inks and any conventional ink which cures upon contact with a material having an elevated temperature is suggested.

While printing variegated colors and textures such as wood grains could alleviate the above-mentioned consistency problem associated with providing streaked stained wood appearances through a multi-viscosity fusion process, there is no suggestion in Bosler et al. for overcoming the distortion problems caused by differences in the coefficient of liner thermal expansion. In fact, the '794 patent mentions that its extrudable plastic substrate material can include ASA, and there is no recognition in Bosler et al. regarding the contraction rate problem or its solution.

Accordingly, there is a present need for an improved capstock material which provides the weatherability of traditional co-extruded coatings and which enables detailed variegated patterns, without distortion or dimensional tolerance problems, or melt rheology complications.

SUMMARY OF THE INVENTION

This invention provides, in a first embodiment, an exterior building material which includes a substrate containing a thermoplastic, such as PVC, polyethylene, polypropylene, polystyrene or mixtures thereof and a capstock layer applied directly to the substrate, said capstock layer comprising a fluorocarbon resinous composition.

The present invention can be applied to all types of PVC-based products, for example, siding, windows, decking, fencing, trim boards, etc., which generally require a capstock layer to protect them from long term weathering. The inherent problems associated with using existing capstock materials such as ASA or other acrylic resinous compositions, including narrow processing windows and different coefficients of linear thermal expansion values compared to typical thermoplastic substrates, can be overcome by this invention.

The preferred embodiment of this invention employs a thin, coated, painted or printed capstock layer of about 4 mil or less, preferably 1 mil or less, of a fluorocarbon or acrylic-based resinous composition, for example, containing polyvinylidene fluoride ("PVDF") resin. The capstock can, alone or with further coatings, provide a stone, wood or various other appearance characteristics found in other naturally occurring materials. The particular stone "effects" include the appearance characteristics found in synthetic, man-made, metamorphic, sedimentary and/or igneous rocks or natural formations. The particular wood effects include those of grain, color, texture and patterns of synthetic and/or naturally occurring wood and wood-like products, or other organic materials, such as bamboo, straw or cork, for example.

The use of special formations and thin inks, paints or coatings can create consistent special effects, such as variegated wood grains. This invention preferably employs direct printing and/or coating operations for providing both the capstock and, optionally, further layers, which are performed independently of the extrusion process, so as to provide extremely thin coatings to substantially eliminate bowing and dimensional distortion of panel siding, window lineals and other building products. The minimization of bowing and dimensional distortion is achieved by thinner cross-sections, more compatible resins from a coefficient of lineal thermal expansion point of view, the elimination of co-extruded ASA capstock processes, or a combination thereof.

In a most preferred embodiment of this invention, a PVDF polymer such as a water-based emulsion ink or paint containing a copolymer of PVDF and Hexa Fluoro PVDF that is polymerized in the presence of an acrylic component is used for the capstock layer. Such coatings can present an interpenetrating network that is highly compatible or especially adherent to PVC substrates. A primer coating is not necessary.

In other preferred embodiments of the present invention, a method of making an exterior product is provided. This method includes extruding a thermoplastic polymer material comprising PVC to form a base extrudate, coating the base extrudate in-line, while still hot, with a capstock layer comprising a fluorocarbon based resinous composition, and drying the capstock layer to form a UV-resistant protective layer on said base extrudate.

In this and other processes of this invention mono-extrusion techniques are preferred. The spraying, painting, ink jet printing, or gravure roll printing (hereinafter "coating operation") can be located between the extrusion die and the sizer or cooling tank. The extruded material can be printed or coated at a high speed while its surface temperature is high and the material is still pliable. Preferentially, the coating operation can be integrated in-line rather than less desirably as a secondary post-treatment process. The capstock of this invention can be further coated with one, two, three or more additional layers. For example, the capstock layer can represent a background layer, and the top layers can include a pair of variegated printing layers. The capstock layer and each additional layer can be transparent, translucent or opaque with dyes, or colored or pigment inks, to provide a final effect or variegated appearance. The capstock layer is, preferably, an opaque composition which may contain a metal oxide, such as $TiO_2$ for UV resistance.

In one preferred embodiment of this invention, the coating or printed layer includes 100% opaque Kynar® liquid PVDF resin applied onto the extruded hot PVC substrate to provide an aesthetic durable and UV light resistant capstock. The preferred Kynar® resin is a formulated resin system comprising a copolymer of PVDF and Hexa Fluoro PVDF that is polymerized in the presence of an acrylic component. Kynar® PVDF is provided by Arkema, Corp. (www.products.arkemagroup.com).

The present invention can also be useful in connection with roofing materials, such as synthetic slates, tiles or shakes, or in multi-shake roofing panel products. For example, the capstock layer of this invention can be applied directly to a roofing substrate so as to present a printed or otherwise aesthetic appearance to synthetic slates, tiles or shakes, to make them more realistic in appearance.

BRIEF DESCRIPTION OF THE DRAWINGS

The disclosed invention will be described with reference to the accompanying drawings, in which.

DETAILED DESCRIPTION OF THE INVENTION

The present invention relates to creating patterns such as variegated colors or wood grains on building materials, for example, decking, fencing, railing, siding and window framing applications, to name a few. This invention employs sprayed, painted, coated or printed capstock layers and top coat layers having a total thickness of preferably less than 4 mils, and more preferably 1 mil or less, which have the ability to perform well long term, and have ample weathering performance, mildew resistance, and dirt repellency, while simultaneously providing good adherence to thermoplastic substrates, such as those manufactured with PVC.

Figure 1:
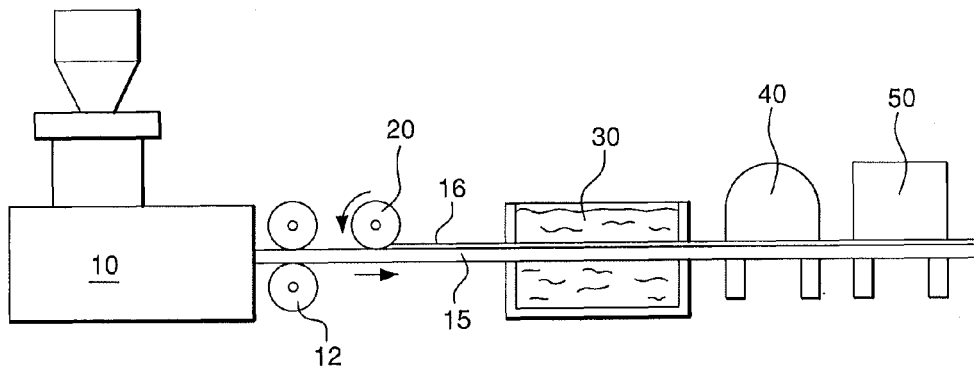
FIG. 1: is a diagrammatic side elevation of a preferred process line for manufacturing the building materials of this invention.

With reference to the FIGURES, and particularly FIG. 1 thereof, there is shown a manufacturing process for making the building materials of this invention. The manufacturing process begins as bulk resin is unloaded from railroad cars to a conveying system, into huge silos holding up to 250,000 pounds or more of material. From these main storage silos, resin is conveyed to a blender where calcium carbonate, $TiO_2$ and other micro-ingredients can be added to create the processing compound. This precise measuring of ingredients and uniform blending under proper heat conditions can be important to the production of uniform, high quality building products.

After blending, the compound is conveyed to the extrusion line where it is carefully metered so a consistent amount enters the extruder 10. The extrusion operation is a process in which thermoplastic resin is pushed through a heated barrel and die by one or more large, precisely tooled screws. As they turn, the screws knead and thoroughly mix the thermoplastic compound, such as PVC, PVC and wood pulp, PVC and copolymers, and/or other thermoplastics such as polystyrene, polyethylene, polypropylene, or extrudable thermosetting resins. Both the screws and the barrel of the extruder are preferably heated which melts the resin and makes it easier to mix and push. The heat (300 to 400° F. for PVC), also accelerates the physical reaction (fusion) between PVC and the micro-ingredients in the compound.

Most vinyl siding is extruded with twin-screw extruders. Twin-screw extrusion is preferable to single-screw extrusion because it heats and distributes material more evenly, resulting in a product with better physical properties. As the PVC compound is forced ahead of the rotating screws, the very tight tolerances in the double barrel promote complete fusion of the ingredients. Color concentrate is added at the extruder, which helps to produce a rich, durable, all the way through color, in each siding product.

In many past examples, co-extrusion has been used to join two flows of molten PVC compound from two extruders in a single die to produce a single sheet made of two layers of material, such as substrate and "capstock." As used herein, the term "capstock" refers to a thin protective layer added to some vinyl building products to improve weatherability and color retention. Typically, the capstock material is made of an acrylic-containing resin, such as AES or ASA. Existing ASA capstock co-extrusion requires a fairly narrow processing window due to the difference in coefficient of linear thermal expansion between ASA and PVC. Missing this window often leads to unacceptable dimensional distortion or bowing of the panel, lineal or board, for example. Additionally, the variegated streaker pigment, used to provide a variegated or wood grain product is inherently difficult to control in an ASA matrix for consistent streak wood grain patterns.

Accordingly, this invention preferably employs one or more spraying, painting, and/or printing steps ("coating step") which follows the extrusion or co-extrusion step for providing both a capstock layer 101 and one or more top coat layers 102, 103 to provide a variegated textured or colored pattern to the building material. This variegated pattern can include a wood grain and can be provided in one or more coating layers. The coating step can include spraying, inkjet printing or gravure roll coating, for example. A gravure roll coater 20 is located between the embossing rollers 12 and the cooling tank 30 in the preferred manufacturing schematic of FIG. 1. Further details of the printing equipment useful for this purpose are provided in U.S. Pat. No. 6,823,794 to Bosler et al, which is hereby incorporated by reference.

As the extrudate exits the extruder 10, the vinyl sheet is still very hot, nearly molten. Between the extruder and the gravure roll coater 20 is typically located a textured roll and rubber roll 12 (collectively) for embossing. Depending on the rollers, and if embossing is required, siding and decking products and accessories are typically embossed in either rough cedar, wood grain, smooth brushed or a smooth finish that looks like sanded, sealed and painted wood. The coating step, shown in the exemplary embodiment as employing a gravure roll coater 20 ("print roll"), can be located before or after the embossing step, or before or after the sizer, for example.

Some building products are also treated with a post-forming step, which includes equipment, such as sizers and formers, which provide greater consistency in thickness and profile. Post-formed locking devices in siding, for example, have tighter tolerances and more intricate interlocking structures, which can result in higher wind load ratings. Post-forming operations can further include pre-sizers and vacuum sizers immediately prior to the cooling tank 30 to create distinctive profiles and a wide range of sizes for vinyl products. In a vacuum sizing calibrator (not shown), the sizing is given a crisp finish profile.

The cooling tank 30 can be located after any post-forming operation. Once the hot sheet including the painted or printed layer 16 over the PVC substrate 15 is introduced into the cooling tank 30, the panel temperature quickly drops and the final shape sets. The preferred painted or printed capstock layer can be dry before, during or after being cooled in the cooling tank 30. Preferably the capstock coating step occurs prior to water cooling, so that the substrate's heat of extrusion can be used to dry the capstock coating. In one preferred embodiment, one or more computer controlled ink jet printers can be used for depositing one or more print layers in rapid succession, such as a 100% opaque capstock layer followed by two or three printed variegated layers, prior to water cooling.

After passing through the cooling tank 30, the PVC substrate 15 and painted or printed layer 16 is punched at precise intervals for nail holes. This can be accomplished with a nail punch 40. Finally, the siding is cut to length at cut off 50, inspected and packaged.

Figure 2:
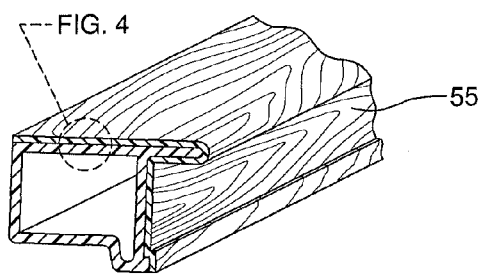
FIG. 2: is a front partial perspective view of a window lineal produced in accordance with this invention.
Figure 3:
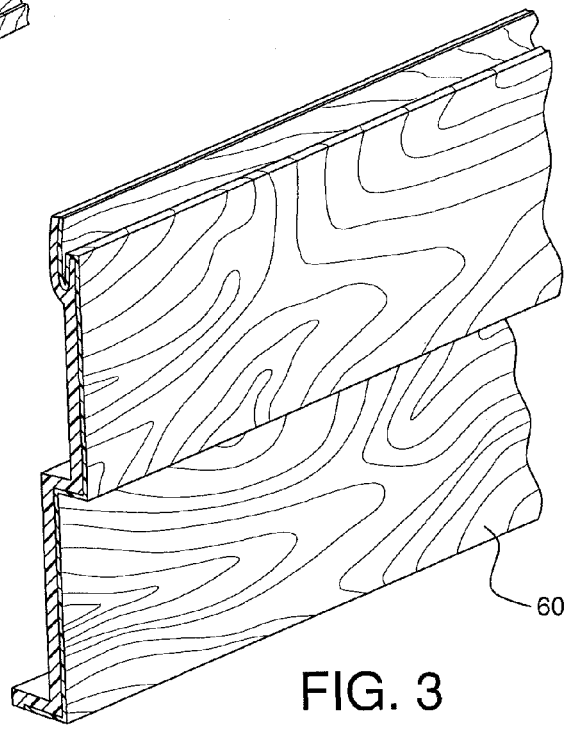
FIG. 3: is a front partial perspective view of a siding member produced in accordance with this invention.
Figure 4:
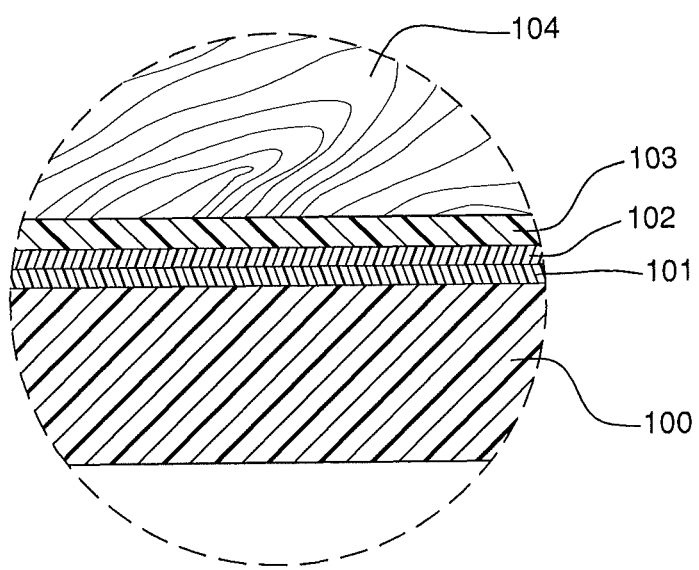
FIG. 4: is an enlarged view of a portion of the window lineal of FIG. 2, showing a preferred number of layers.

As shown in FIGS. 2-4, a window lineal 55 and siding 60, made pursuant to this invention, are provided. The window lineal 55 and siding 60 include a preferred simulated woodgrain or multi-colored appearance. This variegated effect or appearance can be produced by employing transparent, translucent, or opaque polymer matrices and color particles, such as pigments and dyes, and reflective and semi-reflective materials, such as mica, and textured materials, such as wood pulp, wood or paper pulp, for example. See U.S. Pat. No. 6,752,941 and U.S. patent application Ser. No. 10/983,389 which are hereby incorporated by reference in its entirety.

As shown in FIG. 4, the preferred coating or capstock layer comprises a capstock layer 101, first top coat layer 102, and second top coat layer 103, disposed over a thermoplastic or thermosetting substrate 100. One or more of the capstock layer 101, first top coat layer 102, and second top coat layer 103 can include pigments or effects for creating a wood grain 104, or other pattern or texture. The use of the preferred inks, pigments, coatings or paints can create consistent variegated wood grains, textures and colors. By direct printing or coating, for example, these effects can be provided without distortion or bending of thin panels, long decking planks, or intricate widow lineals. Preferably, the total coating thickness will be less than 4 mils, and preferably, 1 mil or less, compared to existing co-extruded ASA capstock layers of about 4-6 mils. Bowing can be minimized since hot co-extruded ASA capstock can be avoided.

While various coatings can be employed in connection with variegated surfaces of this invention, fluorocarbon resinous compositions, including PTFE, PFA, ETFE, ECTFE, FEP, PVDF, PPS, EFEP, TEFLON®, and other thermoplastic or thermosetting resins, are desirable. These compositions can be applied to thermoplastic or thermosetting sheets or construction materials by such techniques as thermal spraying, paint spraying, fusion coatings, inkjet printing, and gravure roll printing, for example.

The preferred method of this invention for making the capstock layer 101 and the first and second top coat layers 102, 103 of the variegated building products of this invention, employs a water base emulsion ink or paint containing a copolymer of PVDF and Hexa Fluoro PVDF that is polymerized in the presence of an acrylic component. The preferred coating is sold under the trademark Kynar® and is provided by Arkema. Kynar® PVDF coatings are tough engineering thermoplastics that are resistant to harsh thermal, chemical and ultraviolet environments. Kynar® resins are readily melt-processed by standard methods of extrusion and injection compression molding, and can be dissolved in polar solvents such as organic esters and amines. The selective solubility is an advantage in the preparation of corrosion resistant coatings for long-life architectural finishes on building materials.

Both rigid and flexible versions of Kynar® PVDF resin are available. While Kynar® resins are usually melt-processed by extrusion, injection molding, compression molding and the like, they can also be provided in functional powder coating systems, resins for rotational molding and open and close cell foams. Desirable versions of Kynar® resin include Kynar 500® resin for architectural applications and Kynar Aquatec water based PVDF coating. The Kynar 500® resin for architectural applications is polyvinylene fluoride PVDF, used as a base resin in a liquid coating formulation by paint manufacturers. When formulated into a coating composition, which contains a minimum of 70 weight % of Kynar 500® resin, the resulting coating exhibits color retention, gloss retention, chalk resistance, corrosion resistance, flexibility, and stain resistance. Plastisols, emulsions, solvent-based and water-based resin systems are useful within the context of this invention.

EXAMPLE

TABLE 1

Working example of Liquid Cap-Stock

| Ingredient | Supplier | phr * |
|---|---|---|
| Substrate Compositions | | |
| PVC Resin | CertainTeed | 100 |
| Methyl tin Stabilizer | Arkema | 1.0 |
| Lubricant 1, Ca Stearate | Baerlocher | 1.4 |
| Lubricant 2, PE Wax | Honeywell | 0.2~0.3 |
| Lubricant 3, Paraffin Wax | Honeywell | 1.5 |
| Impact Modifier, Acrylics | Rohm and Haas | 4.0 |
| Pigment, TiO2 | Kronos, DuPont | 0.8 |
| Filler, CaCO3 | Specialty Mineral | 10.0 |
| Capstock Selections | | |
| 1. Acrylonitrile-styrene-acrylate (ASA) based copolymer | BASF | 100 |
| 2. PVC Cap-Stock | CertainTeed | 100 |

* phr = parts per hundred in reference to the PVC loading level

TABLE 2

| Ingredient | Supplier | phr |
|---|---|---|
| PVC Cap-Stock Composition | | |
| PVC Resin | CertainTeed | 100 |
| Methyl tin stabilizer | Crompton(chemtura) | 1.2 |
| Lubricant 1, Ca Stearate | Baerlocher | 1.7 |
| Lubricant 2, PE Wax | Honeywell | 0.2 |
| Lubricant 3, Paraffin Wax | Honeywell | 0.2 |
| Processing aid, Acrylics | Rohm and Haas | 0.5 |
| Impact Modifier, Acrylics | Rohm and Haas | 4.0 |
| Paint Selections | | |
| 1. Polyvinylidene Fluoride (PVDF) | | |
| 2. Kynar based copolymer | Kalcor | 100 |

TABLE 3

Typical paint formulation

| Add in order: | wt. grams | wet vol. | wt. solids | vol. solids | Notes |
|---|---|---|---|---|---|
| KYNAR AQUATEC RC-10,147 | 90.60 | 75.50 | 43.50 | 29.00 | KYNAR AMF latex |
| Ammonia 29% | 0.55 | 0.55 | 0.00 | 0.00 | Neutralizing agent |
| Gray grind 12473-6-1 | 33.85 | 14.05 | 27.35 | 7.32 | |

TABLE 3-continued

Typical paint formulation

| Add in order: | wt. grams | wet vol. | wt. solids | vol. solids | Notes |
|---|---|---|---|---|---|
| Dipropylene glycol methyl ether | 4.35 | 4.65 | 0.00 | 0.00 | Coalescing agent |
| Acrysol RM-825:water (1:4 dilution) | 0.50 | 0.50 | 0.10 | 0.10 | Thickener (Rohm and Haas) |
| DI water | 4.75 | 4.75 | 0.00 | 0.00 | |
| TOTAL | 134.6 | 100.0 | 70.95 | 36.42 | |

TABLE 4

UV Opacity of Liquid Cap-Stock Test Results

Paint Formulation 1

| Coating Thickness | 3 mil | 2 mil | 1 mil |
|---|---|---|---|
| Dry Film Thickness, mils | 0.60 | 0.40 | 0.24 |
| wavelength, nm | | UV Transmission (%) | |
| 312 | | −0.012 | 0.1404 |
| 340 | | −0.006 | 0.1553 |
| 364 | | −0.006 | 0.1889 |
| 400 | | 0 | 0.2512 |
| 500 | | 0.048 | 0.4229 |

Paint Formulation 2

| Coating Thickness | 3 mil | 2 mil | 1 mil |
|---|---|---|---|
| Dry Film Thickness, mils | 0.53 | 0.35 | 0.20 |
| wavelength, nm | | UV Transmission (%) | |
| 312 | −0.011 | −0.014 | 0.0934 |
| 340 | −0.003 | −0.006 | 0.0834 |
| 364 | −0.018 | −0.017 | 0.0735 |
| 400 | −0.006 | −0.003 | 0.1073 |
| 500 | 0.0006 | 0.0247 | 0.1824 |

Figure 5:
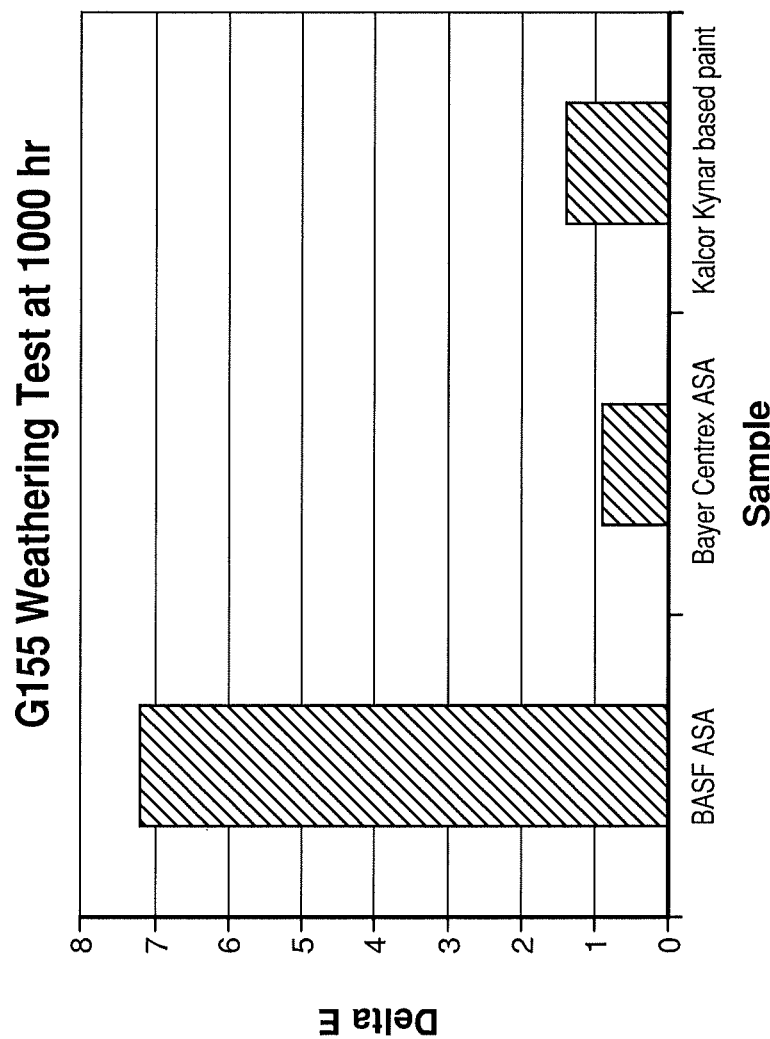
FIG. 5: is a bar chart showing UV weatherability for various coatings shown in the Example.

The weatherability at 1000 hours of paint formulations 1 and 2 in TABLE 2 "Paint Selections", compared to a control having a standard BASF ASA coating, is shown in FIG. 5, wherein Delta E represents the total color difference or change, which is a single number that expresses the magnitude of the difference between two colors, e.g., before and after exposure to the elements.

Components can either be coated or printed in-line prior to water cooling, post-formed from pre-coated polymeric building materials or spray coated after fabrication in the final assembly. Kynar Aquatec provides Kynar® resins in a convenient emulsion form. Coatings formulated from these emulsions provide the combined benefits of extreme weatherability in a VOC-compliant field, or an ambient dry system. The coated, printed or painted layer 16 of this invention can include blended colors, light colors or dark colors. Darker colors, particularly black, blues, greens, browns and grays, tend to absorb more UV light than lighter colors, and would quickly chalk or fade if made in only PVC. The Kynar® based inks and coatings of this invention ensure long term weatherability for these dark colors.

From the foregoing, it can be realized that this invention provides more dimensionally stable thermoplastic and thermosetting building components having a variegated, colored and/or textured appearance. By printing or coating the capstock layer of siding or decking, for example, following the extrusion step, less material can be employed which minimizes expenses. This process also minimizes any differences in the coefficient of lineal thermal expansion between the capstock and the underlying substrate. The Kynar® inks or paints of this invention can be water-based systems that can be applied directly without primer onto PVC substrates at less than 400° F., preferably about 250° F.-340° F. (120-170° C.), and dried rapidly. The application techniques can include painting, gravure roll printing, spraying, or inkjet printing. The Kynar® resin system can serve as both the capstock layer as well as a printing background simultaneously, and optionally, can serve as one or more top printing layers with colored Kynar® inks to give a final variegated appearance.

What is claimed:

1. A method of making an exterior building product consisting of a base extrudate, a capstock layer and at least one variegated colored pattern layer comprising:
   a) forming the base extrudate by extruding a thermoplastic polymeric material consisting of PVC, polyethylene, polypropylene, polystyrene, or mixtures thereof, at an elevated temperature, and thereafter, while said base extrudate is still hot, followed by;
   b) coating and adhering the capstock layer, consisting of a fluorocarbon-based or acrylic-based UV-resistant resin, onto said base extrudate, wherein the capstock layer is about 4 mil or less, wherein the step of coating the base substrate while still hot with a UV resistant liquid capstock layer comprises applying PVDF ink in a water-based system directly on the substrate without a primer at a temperature from about 250° F. to about 340° F. (about 120° C. to about 170° C.), the method further comprising water cooling prior to said drying;
   c) thereafter, applying each said variegated colored pattern layer directly on the capstock layer; and
   d) drying each said variegated colored pattern layer, and drying said capstock layer to form a UV-resistant protective layer on said base extrudate.

2. The method of claim 1 wherein said coating and adhering step (b) comprises spraying, printing or painting said fluorocarbon-based capstock layer without a primer layer.

3. The method of claim 1 wherein said coating and adhering step (b) comprises one or more of a paint spraying step, an ink jet printing step, or a gravure roll printing step.

4. The method of claim 1 wherein said drying step (d) at least uses heat from said base extrudate while still hot.

5. The method of claim 1, wherein the method forms one of the group consisting of a roofing slate, tile, shake, siding panel, window profile, decking member, fencing member, or trim board.

6. The method of claim 1, wherein step (b) includes coating the capstock layer directly on the base extrudate.

7. The method of claim 1, wherein the thermoplastic polymeric material comprises PVC and the capstock layer is variegated.

8. The method of claim 1, wherein said variegated colored pattern layer comprises at least one top coating layer comprising a fluorocarbon-based resin, said capstock and said top coating layer being variegated to indicate wood grain.

9. The method of claim 8, wherein said variegated colored pattern layer comprises a formulated resin system comprising a copolymer of PVDF and Hexa Fluoro PVDF.

10. The method of claim 1, wherein said capstock layer comprises a formulated resin system comprising a copolymer of PVDF and Hexa Fluoro PVDF.

11. A method of making an exterior building product including siding, window profiles, decking, fencing, trim boards, or a combination thereof, consisting of a base extrudate, a capstock layer and at least one variegated topcoat comprising:
 a) extruding a thermoplastic polymeric material consisting of PVC to form a base extrudate having a first coefficient of linear thermal expansion, the base extrudate having an elevated temperature, and thereafter, while said base extrudate is still hot, followed by;
 b) coating and adhering the capstock layer, consisting of a UV-resistant PVDF-based liquid resin capstock layer having a second coefficient of linear thermal expansion different from that of the base extrudate, wherein a thickness of the capstock layer is about 4 mil or less, wherein the step of coating the base substrate while still hot with a UV resistant liquid capstock layer comprises applying PVDF ink in a water-based system directly on the substrate without a primer at a temperature from about 250° F. to about 340° F. (about 120° C. to about 170° C.), the method further comprising water cooling prior to said drying; and
 c) thereafter, applying each said at least one variegated top coat directly to said capstock layer and permitting each said top coat to dry.

12. A method of making a building material consisting of a base extrudate, a capstock layer and at least one topcoat layer comprising:
 extruding a base substrate consisting of PVC at an elevated temperature, the base substrate having a first coefficient of linear thermal expansion, and thereafter, while said base extrudate is still hot, followed by;
 coating and adhering the capstock layer, consisting of a UV-resistant liquid PVDF or ASA resin having a second coefficient of linear thermal expansion different from that of the base substrate, wherein a thickness of the capstock layer is about 4 mil or less, wherein the step of coating the base substrate while still hot with a UV resistant liquid capstock layer comprises applying PVDF ink in a water-based system directly on the substrate without a primer at a temperature from about 250° F. to about 340° F. (about 120° C. to about 170° C.), the method further comprising water cooling prior to said drying;
 applying on said capstock layer after drying thereof at least one top coat layer comprising PVDF resin directly on said PVDF or ASA resin of said capstock layer, wherein each said top coat layer is variegated to indicate wood grain; and
 drying each said top coat layer.

13. The method of claim 12, wherein said topcoat layers are variegated with different variegations.

14. The method of claim 13, wherein all said top coat layers comprise a formulated resin system comprising a copolymer of PVDF and Hexa Fluoro PVDF.

15. The method of claim 12, wherein the coating step includes self-adhering the capstock layer directly on said base substrate comprising PVC without a primer therebetween.

16. The method of claim 12, wherein coating with at least one top coat layer includes printing by one or more computer controlled ink-jet printers.

17. The method of claim 12, wherein the capstock layer is opaque, and wherein the step of coating with at least one top coat layer includes printing.

* * * * *